J. PIOTROWSKI.
TROLLEY.
APPLICATION FILED MAR. 8, 1912.
1,048,732.
Patented Dec. 31, 1912.
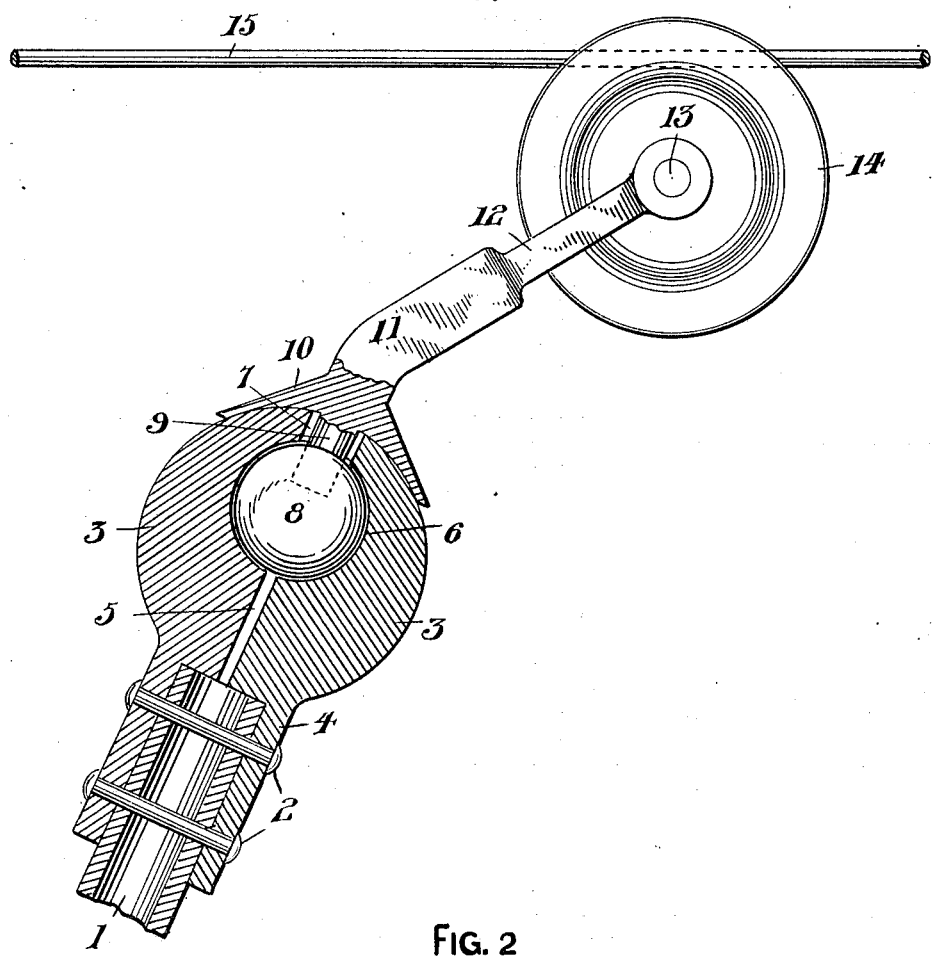
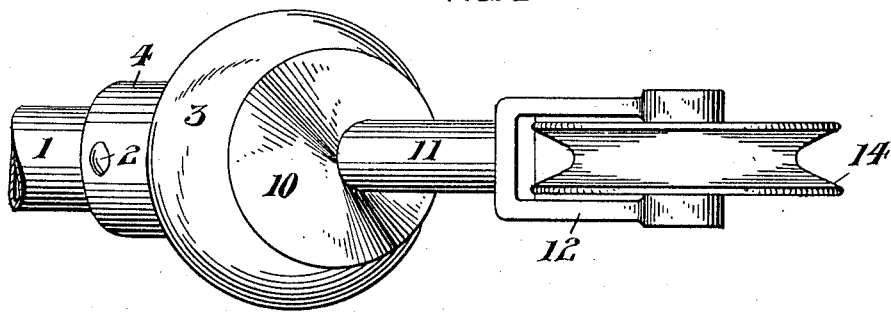

UNITED STATES PATENT OFFICE.

JOZEF PIOTROWSKI, OF UNIONTOWN, PENNSYLVANIA.

TROLLEY.

1,048,732.

Specification of Letters Patent. Patented Dec. 31, 1912.

Application filed March 8, 1912. Serial No. 682,421.

*To all whom it may concern:*

Be it known that I, JOZEF PIOTROWSKI, a subject of the Emperor of Austria-Hungary, residing at Uniontown, in the county of Fayette and State of Pennsylvania, have invented certain new and useful Improvements in Trolleys, of which the following is a specification, reference being had therein to the accompanying drawing.

This invention relates to trolleys, and the primary object of my invention is to provide the upper end of a trolley pole with a novel swivel for a harp, whereby the harp can adjust itself to retain the trolley wheel thereof normally in engagement with a trolley wire, rail or conductor, thereby preventing accidental displacement of the trolley wheel due to curved sections of trolley wire or irregularities upon the wire.

Another object of this invention is to provide a swiveled trolley harp that is inexpensive to manufacture, durable, applicable to various types of trolley poles and highly efficient for the purposes for which it is intended.

With the above and other objects in view, the invention resides in the novel construction, combination and arrangement of parts to be hereinafter specifically described and then claimed.

Reference will now be had to the drawing, wherein:—

Figure 1 is a side elevation of the trolley partly broken away and partly in section, and Fig. 2 is a plan of the same.

The reference numeral 1 denotes a portion of a tubular trolley pole and secured to the upper end of said pole by rivets 2 or other fastening means is a socket member, comprising semi-spherical sections 3 that have the semi-cylindrical sleeves 4 retained in engagement with the upper end of the pole 1 by the rivets 2. The semi-spherical sections 3 have flat faces 5, said faces having eccentrically located semi-spherical confronting sockets 6 adjacent the outer ends of the sections 3. The confronting flat faces 5 of the sections 3, at the outer ends thereof, are provided with confronting grooves that form an opening 7 in communication with the sockets 6.

Located within the sockets 6 is a spherical bearing or ball 8 provided with a pin 9 that extends through the opening 7, said pin being formed integral with a conical shaped head 10 that is in engagement with the sections 3 and movable thereon. The diameter of the pin 9 is considerably less than the diameter of the opening 7 through which the same passes, whereby the pin carrying the harp 12 will have a side as well as rotary movement and forming substantially a universal joint, thereby permitting the trolley wheel to assume a number of different positions. By forming the confronting openings 6 in the sections 3 adjacent the outer ends thereof a larger radius of movement is permitted the pin 9. The head 10 is formed integral with the shank 11 of a harp 12 and revolubly mounted in said harp by journal pins 13 is a trolley wheel 14, said harp and said wheel being of the ordinary and well known type.

From the foregoing it will be observed that the shank 11 of the harp 12 is swiveled relatively to the socket member, consequently said harp can swing whereby the trolley wheel 14 will remain normally in engagement with a trolley wire 15 or other electric conductor.

It is to be understood that the structural elements of my invention are susceptible to such changes as fall within the scope of the appended claim.

What I claim is:—

In a trolley, the combination with a trolley pole, of a socket member mounted upon the upper end of said pole and comprising semi-spherical spaced sections having flat confronting faces, semi-cylindrical sleeves carried by the inner ends of said sections and secured to said pole, the flat faces of said sections above their center having confronting semi-spherical sockets formed therein, the flat faces of said sections being grooved to provide a cylindrical opening in communication with said sockets, a spherical body movably mounted in said sockets, a pin carried by said body and extending through the opening, said pin of materially reduced diameter with respect to the diameter of said opening to provide a substantially universal movement, a conical-shaped head carried by said pin and engaging the upper portion of the periphery of said socket sections, an inclined shank projecting from said head, a harp shank formed integral with said shank, and a trolley wheel revolubly supported by said harp shank.

In testimony whereof I affix my signature in the presence of two witnesses.

JOZEF PIOTROWSKI.

Witnesses:
J. T. DAVIES,
LOUIS CISENKO.

Copies of this patent may be obtained for five cents each, by addressing the "Commissioner of Patents, Washington, D. C."